No. 722,172. PATENTED MAR. 3, 1903.
L. BOLZ.
COMBINED FILTER AND PRESS.
APPLICATION FILED SEPT. 16, 1901.

NO MODEL. 2 SHEETS—SHEET 1.

ATTEST.  
R. B. Moett  
H. E. Mudra

INVENTOR.  
Leonard Bolz  
By W. F. Fisher ATTY.

No. 722,172. PATENTED MAR. 3, 1903.
L. BOLZ.
COMBINED FILTER AND PRESS.
APPLICATION FILED SEPT. 16, 1901.
NO MODEL. 2 SHEETS—SHEET 2.
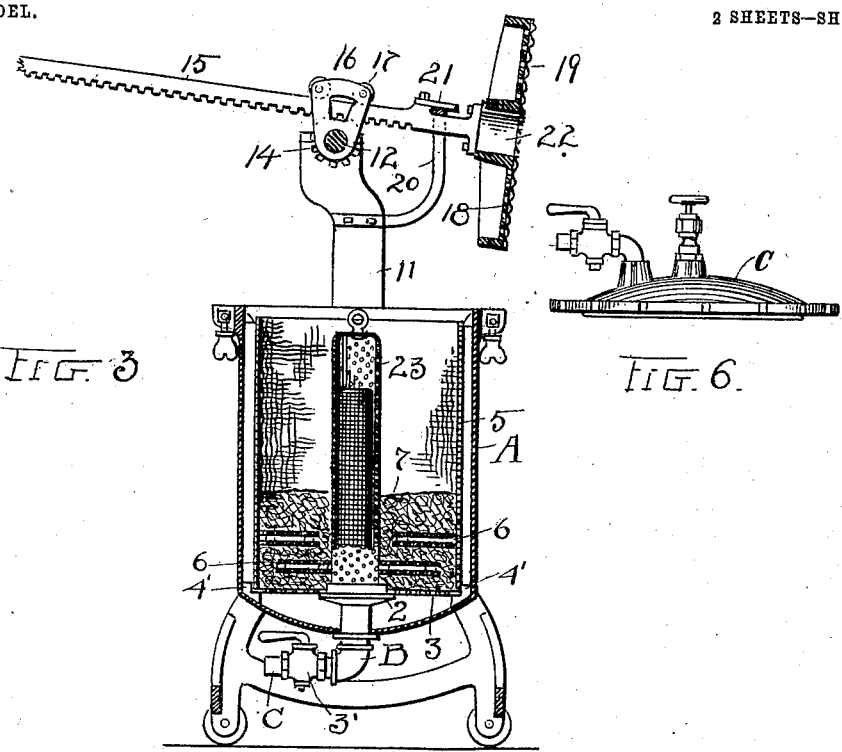
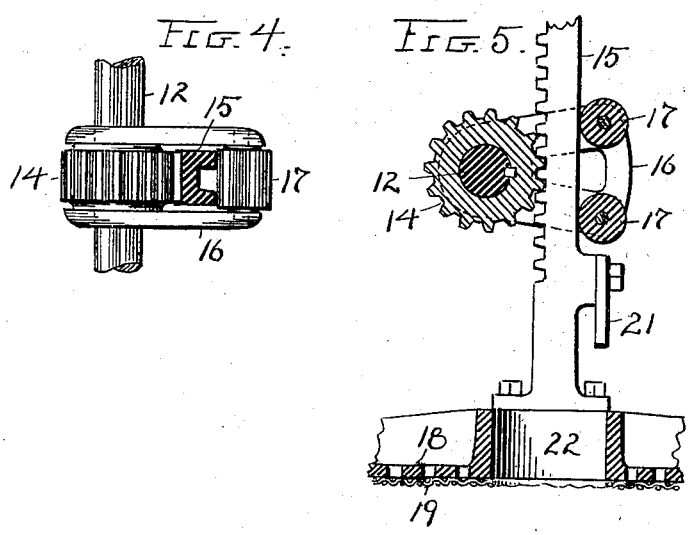
ATTEST
R. B. Moert
H. E. Mudra
INVENTOR
Leonard Bolz
By H. V. Fisher ATTY

UNITED STATES PATENT OFFICE.

LEONARD BOLZ, OF CLEVELAND, OHIO.

COMBINED FILTER AND PRESS.

SPECIFICATION forming part of Letters Patent No. 722,172, dated March 3, 1903.

Application filed September 16, 1901. Serial No. 75,499. (No model.)

*To all whom it may concern:*

Be it known that I, LEONARD BOLZ, a citizen of the United States, residing at Cleveland, in the county of Cuyahoga and State of Ohio, have invented certain new and useful Improvements in a Combined Filter and Press; and I do declare that the following is a full, clear, and exact description of the invention, which will enable others skilled in the art to which it appertains to make and use the same.

My invention relates to improvements in a combined filter and press; and the improvement consists in the construction and arrangement of parts, all substantially as shown and described, and particularly pointed out in the claims.

The object of the invention is to provide a filter which utilizes filtering material, such as cellulose pulp, with a press attachment to compress said material within the filter in a compact form.

Another object is to provide simple means for retiring and holding back the press parts whenever the filter is to be charged with filtering material preparatory to compressing and also during the time the filtering is being carried on.

Figure 1:
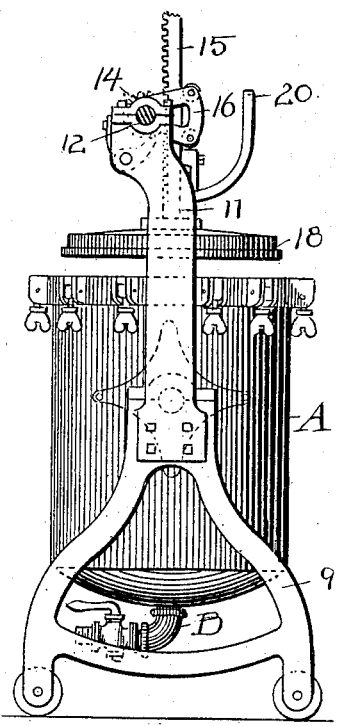
Figures 2, 7:
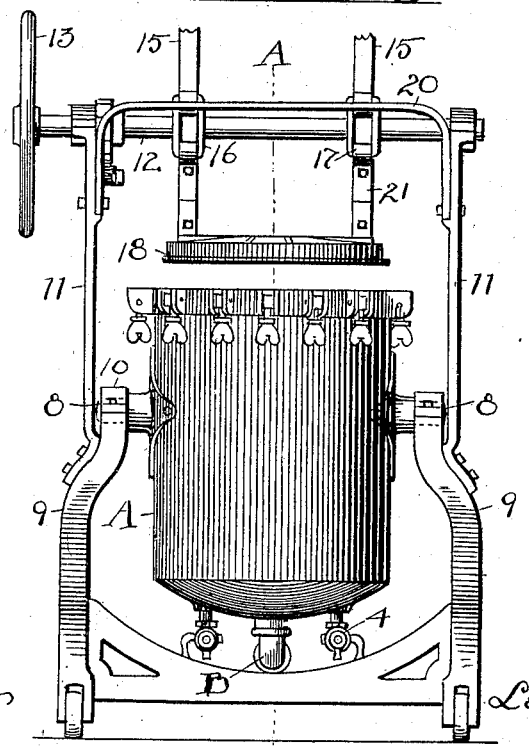

In the accompanying drawings, Figure 1 is a side elevation of a filter with the press attachment thereon and in raised position preparatory to either its descent into the filter or its removal to one side. Fig. 2 is a rear elevation of the parts as seen in Fig. 1. Fig. 3 is a central vertical section on line A A, Fig. 2, showing the press attachment raised and held at one side. Fig. 4 is a detail plan view of one of the rack guiding and supporting members. Fig. 5 is a central sectional view of a rack guiding and supporting member with a rack-bar in place therein, said bar having the packing-plate at its bottom also shown in section. Fig. 6 is a side elevation of the cover of the filter removed from the filter. Fig. 7 is a detail view showing the ratchet and double-acting pawl for holding the cross-shaft against back rotation.

A represents the casing or shell of the filter, which is circular in cross-section preferably and has a concave bottom into which is tapped at its center the outlet or discharge coupling B, which has a flange 2 about its top, forming a support for certain elements for the interior of the filter, as will hereinafter appear. The discharge-pipe section C for the filtered liquid is threaded into joint B and has a controlling cock or valve 3'. There is also a separate valve-controlled outlet 4 in the bottom of the casing to carry away any accumulations of water or the like as they may occur in the said bottom by reason of compressing the filtering-mass. A false perforated bottom 3 rests on flange 2 at its center and shoulders 4' at the side of the casing. A wire-mesh crib 5, of less diameter than the interior of the casing, rests upon false bottom 3 and forms a fluid-space between the casing and crib all around the full depth of said crib. Suitable liquid-conductors 6 are arranged one above the other within the crib to distribute the liquid to be filtered through the filtering material 7, which is interposed between said conductors. It is in this connection that the press is needed—that is to say, when the liquid-conductors 6 are built up from the bottom the filtering material or mass must be placed into position and compressed. The filtering material is poured in upon the top of each conductor 6 to a depth of three inches or thereabout and then compressed to about one and a half inches before another conductor is placed in position and the same process repeated. In order that this part of the work be done efficiently and rapidly, I have combined a press attachment with the filter, as follows: The casing of filter A is provided with trunnions 8, which rest in bearings on the main frame or support 9 for the filter, and upon this frame, at each side thereof and opposite trunnions 8, are bolted vertical standards 11, which carry the press parts. Said standards have bearings at their top end, which support a cross-shaft 12, having a set of gears 14 rigidly secured thereon. Gears 14 are arranged on said shaft at equal distances apart of the vertical center of the filter and are held in constant mesh with a set of rack-bars 15 by means of guiding and supporting members 16, which comprise a pair of plates arranged and mounted to rotate upon shaft 12 at each side of each gear 14 and having rollers 17, mounted on shafts or pins connecting said plates at their outer extremities. Said rollers bear against the back edge of bars 15 and hold said bars at their toothed front edges in engagement at all times with gears 14. The lower ends of rack-bars 15 are bolted to a compressing or packing plate 18, which consists of a perforated plate having a gauze or wire mesh fabric 19 fastened to its bottom. In operation said plate is lowered into the filter after the filtering material has been placed in position therein, and power is applied to compress said material by rotating shaft 12 by means of a hand-wheel 13 at one end of said shaft, and thereby causing gears 14 to force rack-bars 15 and packing-plate 18 down.

The filters of the largest capacity are from twenty-four to thirty inches in diameter, and the top edge of the filter-casing stands some four feet from the floor. Taking the size of the filter in consideration it will be seen that the handling of the heavy liquid-conductors and the packing-plate during the operation of filling and compressing would entail a great deal of time and labor unless means for simplifying the operation were at hand. This means comprises the actuating mechanism for raising and lowering packing-plate 18, as heretofore described, and also includes the construction which permits the swinging of said plate 18 to one side and the means for holding the same out of the way during that part of the time when new material is placed within the filter. To this latter end, a cross-bar 20 bridges over the top of the filter at the rear of the rack-bars, and this bar 20 is rigidly bolted to and supported by standards 11. Then each rack-bar 15 is provided at or near its bottom and rear edge with a projection or hook 21, which is adapted to engage bar 20, as seen in Fig. 3, when the packing-plate is raised and swung back out of the way. The operation of raising and swinging the packing-plate to one side and suspending it at that elevation is easily and quickly accomplished, and all the necessary room and freedom for working and filling the filter is thereby obtained. With plate 18 at one side, as described, no water can drip down upon the operator while he is bending over the filter.

A uniform and even compression throughout the body of the filtering material is obtained by reason of the use of a set of gears and racks arranged, as shown, at each side of the vertical center. Where a central opening is desired in the body of the filtering material, as in this style of filter, an opening 22 is made centrally in plate 18. A tube 23 is placed centrally within the filter and opening 22 encircles tube 23 when plate 18 is lowered to compress the mass.

In Fig. 6 I show an enlarged elevation of a cover C for the filter, and this cover is adapted to be placed upon the filter-casing and fixed fluid tight thereon during the operation of filtering; otherwise it is removed, as shown, when the press is to be employed for packing the filtering media.

In Fig. 7 I show a cross-section of shaft 12 and a broken-off section of one of the posts 11, supporting the same, and a ratchet-wheel 30 and a pawl 31, and such pawl and ratchet are adapted to hold the shaft 11 against backward rotation.

What I claim is—

1. A filter-casing and a supporting-frame therefor, in combination with a press attachment pivotally mounted on said frame, and a cross-bar on the supporting-frame above said filter-casing adapted to be engaged by the press attachment to hold it when in a raised position, substantially as described.

2. A filter-casing and a supporting-frame therefor, in combination with a press attachment pivotally mounted on said frame, and an arched cross-bar on the supporting-frame above said filter-casing adapted to be engaged by the press attachment, and hooks on said press attachment adapted to secure the same when in a raised position to the arched cross-bar, substantially as described.

3. A filter-casing and a supporting-frame therefor, in combination with a press attachment mounted on said frame comprising a packing-plate having rack-bars provided with hooks, a cross-shaft having gears, and a rearwardly-extending arched cross-bar attached to the main frame above said filter-casing, and adapted to be engaged by the hooks on the rack-bars to hold said rack-bars when in a raised position, substantially as described.

4. A filter-casing and a supporting-frame therefor, in combination with a press attachment mounted on vertical standards rising from said frame, said attachment comprising a packing-plate having a pair of rack-bars, a pair of gears engaging said rack-bars mounted on a cross-shaft having a hand-wheel, a cross-bar above said filter attached to the main frame and adapted to be engaged by said rack-bars when they are in a raised position, substantially as described.

5. A filter-casing and a supporting-frame therefor, in combination with a press attachment mounted on said frame, comprising a packing-plate having a pair of rack-bars attached thereto, a cross-shaft having a pair of gears to engage said rack-bars, guiding and supporting members pivotally mounted on said shaft and adapted to bear against said rack-bars and prevent lateral movement of the same, a cross supporting-bar above said filter-casing adapted to engage and hold said rack-bars and packing-plate when in a raised position, substantially as described.

Witness my hand to the foregoing specification this 22d day of August, 1901.

LEONARD BOLZ.

Witnesses:
R. B. MOSER,
H. E. MUDRA.